(12) United States Patent
Fujimoto et al.

(10) Patent No.: US 12,115,871 B2
(45) Date of Patent: Oct. 15, 2024

(54) WIRELESS POWER RECEIVING SYSTEM, MOBILE OBJECT, AND VEHICLE WHEEL

(71) Applicants: THE UNIVERSITY OF TOKYO, Tokyo (JP); BRIDGESTONE CORPORATION, Tokyo (JP); NSK Ltd., Tokyo (JP)

(72) Inventors: Hiroshi Fujimoto, Tokyo (JP); Takehiro Imura, Tokyo (JP); Osamu Shimizu, Tokyo (JP); Katsuhiro Hata, Tokyo (JP); Keizo Akutagawa, Tokyo (JP); Yasumichi Wakao, Tokyo (JP); Isao Kuwayama, Tokyo (JP); Daisuke Gunji, Fujisawa (JP)

(73) Assignees: THE UNIVERSITY OF TOKYO, Tokyo (JP); BRIDGESTONE CORPORATION, Tokyo (JP); NSK Ltd., Tokyo (JP)

(*) Notice: Subject to any disclaimer, the term of this patent is extended or adjusted under 35 U.S.C. 154(b) by 151 days.

(21) Appl. No.: 17/597,788

(22) PCT Filed: Jul. 22, 2020

(86) PCT No.: PCT/JP2020/028506
§ 371 (c)(1),
(2) Date: Jan. 24, 2022

(87) PCT Pub. No.: WO2021/015252
PCT Pub. Date: Jan. 28, 2021

(65) Prior Publication Data
US 2022/0266702 A1    Aug. 25, 2022

(30) Foreign Application Priority Data
Jul. 25, 2019  (JP) ................. 2019-137267

(51) Int. Cl.
*B60L 53/12* (2019.01)
*B60K 1/04* (2019.01)
(Continued)

(52) U.S. Cl.
CPC ............... *B60L 53/12* (2019.02); *B60K 1/04* (2013.01); *B60K 7/00* (2013.01); *B60L 9/00* (2013.01);
(Continued)

(58) Field of Classification Search
CPC ........ B60L 53/12; B60L 9/00; B60L 2240/46; B60L 53/32; B60K 1/04; B60K 7/00;
(Continued)

(56) References Cited

U.S. PATENT DOCUMENTS 8,008,888 B2   8/2011 Oyobe et al.
10,644,544 B2  5/2020 Kanno
(Continued)

FOREIGN PATENT DOCUMENTS

JP   2009106136 A   5/2009
JP   2010041824 A   2/2010
(Continued)

OTHER PUBLICATIONS

Jul. 19, 2023, search result of the Extended European Search Report issued by the European Patent Office in the corresponding European Patent Application No. 20844176.6.
(Continued)

*Primary Examiner* — Lincoln D Donovan
*Assistant Examiner* — Alex W Lam
(74) *Attorney, Agent, or Firm* — KENJA IP LAW PC

(57) ABSTRACT

A wireless power receiving system includes: a power receiving device having a power receiving coil configured to receive electric power supplied wirelessly from a power transmission coil of a power transmission device installed on
(Continued)

a road surface, at least part of the power receiving coil being contained in a vehicle wheel; and in-vehicle devices installed in a mobile object, the in-vehicle devices being energizably connected to the power receiving device. The power receiving device transmits the received electric power to the in-vehicle devices.

20 Claims, 3 Drawing Sheets

(51) Int. Cl.
    *B60K 7/00*         (2006.01)
    *B60L 9/00*         (2019.01)
    *H02J 50/10*       (2016.01)

(52) U.S. Cl.
    CPC ...... *H02J 50/10* (2016.02); *B60K 2007/0092* (2013.01)

(58) Field of Classification Search
    CPC .... B60K 2007/0092; B60K 2001/0405; B60K 2007/0038; B60K 7/0007; B60K 2001/045; H02J 50/10; H02J 7/02; H02J 50/005; H02J 2310/40; H02J 50/27; H02J 50/80; H02J 50/12; H02J 50/70; H02J 50/50; H02J 5/005; H02J 50/20; H02J 7/025; H02J 7/007; H02J 7/00034; H02J 7/00045; H02J 7/0042; H02J 7/0027; H02J 7/2434; H02J 50/60; H02J 50/90; H02J 50/40; H02J 50/402; H01F 38/14; H01F 27/24; H01F 27/36; H01F 27/28; H01F 2007/1888

See application file for complete search history.

(56) References Cited

U.S. PATENT DOCUMENTS

| | | | |
|---|---|---|---|
| 2010/0225271 A1* | 9/2010 | Oyobe | B60L 50/61 |
| | | | 320/108 |
| 2015/0210170 A1 | 7/2015 | Oyobe et al. | |
| 2017/0136896 A1* | 5/2017 | Ricci | B60L 53/12 |
| 2017/0274790 A1* | 9/2017 | Kim | B60L 1/00 |
| 2019/0077269 A1 | 3/2019 | Wang et al. | |
| 2019/0315246 A1* | 10/2019 | Li | B60L 53/68 |
| 2022/0149666 A1* | 5/2022 | Sumiya | B60L 53/122 |

FOREIGN PATENT DOCUMENTS

| | | |
|---|---|---|
| JP | 2013207903 A | 10/2013 |
| JP | 2013207908 A | 10/2013 |
| JP | 2014195350 A | 10/2014 |
| JP | 2017093113 A | 5/2017 |
| JP | 2018068077 A | 4/2018 |
| KR | 101217655 B1 | 1/2013 |

OTHER PUBLICATIONS

Jan. 25, 2022, International Preliminary Report on Patentability issued in the International Patent Application No. PCT/JP2020/028506.

Oct. 13, 2020, International Search Report issued in the International Patent Application No. PCT/JP2020/028506.

* cited by examiner

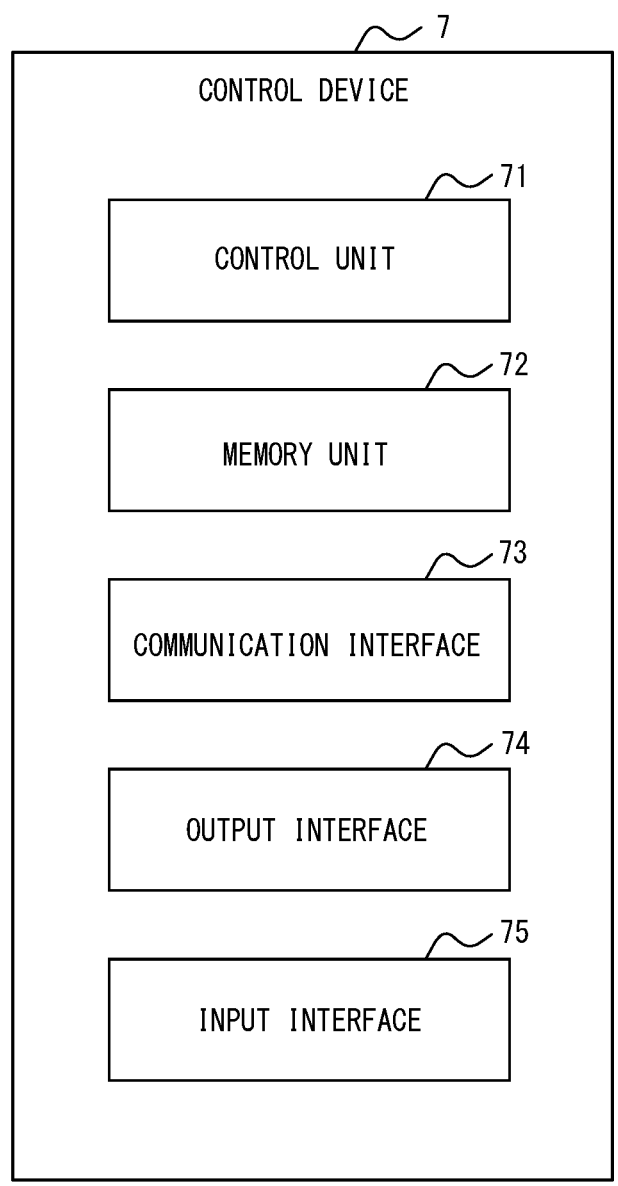

WIRELESS POWER RECEIVING SYSTEM, MOBILE OBJECT, AND VEHICLE WHEEL

TECHNICAL FIELD

The disclosure relates to a wireless power receiving system, a mobile object, and a vehicle wheel.

BACKGROUND

Wireless power supply technology in which a power transmission device installed on a road, a parking space, or the like wirelessly supplies electric power to a power receiving device installed in a vehicle is known. For example, Patent Literature (PTL) 1 discloses a vehicle equipped with a power receiving device on the underside of the vehicle so that the vehicle can receive electric power from a power transmission device installed on a road surface.

CITATION LIST

Patent Literature

PTL 1: JP 2018-068077 A

SUMMARY

Technical Problem

However, in the conventional wireless power supply technology described above, when the distance between the power transmission device installed on the road surface and the power receiving device installed on the vehicle traveling on the road surface is far, an obstacle such as a small animal or a piece of metal may enter a space between the power receiving device and the power transmission device, thus causing eddy currents to be generated around the obstacle. Accordingly, power receiving efficiency could be reduced. In addition, the small animal, the piece of metal, or the like that has entered the space between the power transmission device and the power receiving device would be heated and ignite.

It is an aim of the disclosure to provide a wireless power receiving system, a mobile object, and a vehicle wheel that improve power receiving efficiency in wireless power supply.

Solution to Problem

A wireless power receiving system according to the disclosure includes:
  a power receiving device having a power receiving coil configured to receive electric power supplied wirelessly from a power transmission coil of a power transmission device installed on a road surface, at least part of the power receiving coil being contained in a vehicle wheel of a mobile object; and
  at least one in-vehicle device installed in the mobile object, the in-vehicle device being energizably connected to the power receiving device,
  wherein the power receiving device transmits the received electric power to the in-vehicle device.

A mobile object according to the disclosure includes:
  a vehicle wheel;
  a power receiving device having a power receiving coil configured to receive electric power supplied wirelessly from a power transmission coil of a power transmission device installed on a road surface, at least part of the power receiving coil being contained in the vehicle wheel; and
  an in-vehicle device energizably connected to the power receiving device,
  wherein the power receiving device transmits the received electric power to the in-vehicle device.

A vehicle wheel according to the disclosure is a vehicle wheel for a mobile object,
  the vehicle wheel including:
  a power receiving device having a power receiving coil configured to receive electric power supplied wirelessly from a power transmission coil of a power transmission device installed on a road surface, at least part of the power receiving coil being contained in the vehicle wheel; and
  an in-vehicle device energizably connected to the power receiving device,
  wherein the power receiving device transmits the received electric power to the in-vehicle device.

Advantageous Effect

According to the disclosure, a wireless power receiving system, a mobile object, and a vehicle wheel that improve power receiving efficiency in wireless power supply can be provided.

BRIEF DESCRIPTION OF THE DRAWINGS

In the accompanying drawings:

FIG. 3 is a functional block diagram that schematically illustrates an example of configuration of a control device in the wireless power receiving system according to the embodiment of the disclosure.

DETAILED DESCRIPTION

Figure 1:
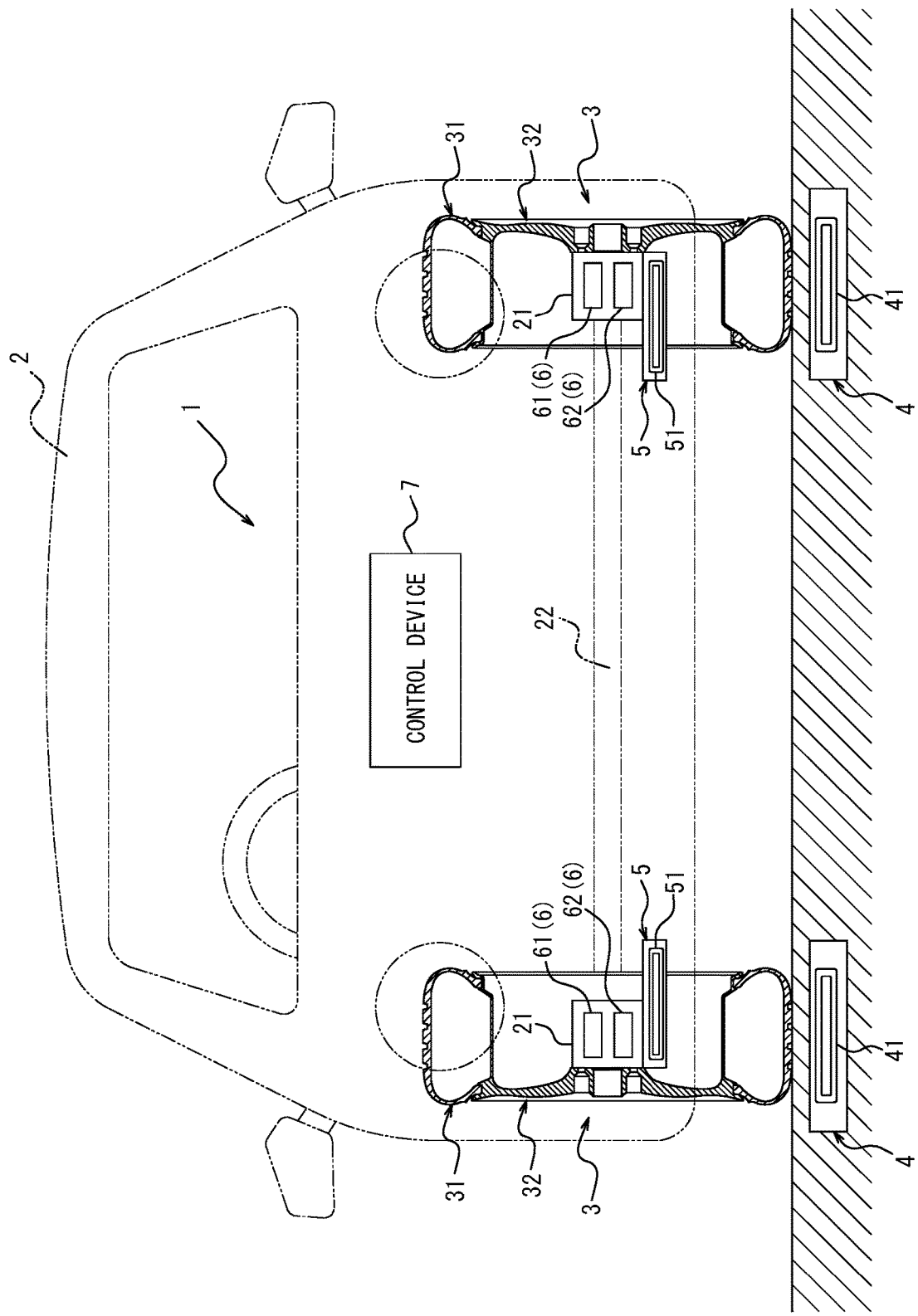
FIG. 1 is a schematic diagram of a wireless power receiving system according to an embodiment of the disclosure, schematically illustrated in a cross-section in a width direction of a vehicle wheel.

A wireless power receiving system, a mobile object, and a vehicle wheel according to an embodiment of the disclosure will be described below with reference to the drawings. In each drawing, the same reference numerals are attached to common parts and components. In this specification, a width direction of the vehicle wheel refers to a direction that is parallel to a rotation axis of the vehicle wheel. A radial direction of the vehicle wheel refers to a direction that is perpendicular to the rotation axis of the vehicle wheel.

(Configuration of Wireless Power Receiving System)

FIG. 1 is a schematic diagram of a wireless power receiving system 1 according to an embodiment of the disclosure, schematically illustrated in a cross-section in a width direction of a vehicle wheel. The wireless power receiving system 1 is used in a mobile object 2 equipped with vehicle wheels 3, to receive electric power from a power transmission device 4 installed on a road surface. The wireless power receiving system 1 includes a power receiving device 5 and in-vehicle devices 6. The power receiving device 5 is at least partially contained in the vehicle wheel 3 of the mobile object 2, and receives electric power supplied wirelessly from the power transmission device 4 installed on the road surface. The in-vehicle devices 6 are installed in the mobile object 2 and energizably connected to the power receiving device 5. While the mobile object 2 is traveling or stopping on the road surface on which the power transmission device 4 is installed, the power receiving device 5 receives electric power wirelessly from the power transmission device 4. The power receiving device 5 transmits the received electric power to the in-vehicle devices 6.

The wireless power receiving system 1 may further include a control device 7. The control device 7 is communicatively connected to the power receiving device 5 and the in-vehicle devices 6 via an in-vehicle network such as CAN (Controller Area Network). The control device 7 can control the power receiving device 5 and the in-vehicle devices 6 to cause the electric power received wirelessly by the power receiving device 5 to be transmitted to the in-vehicle devices 6. The positions and numbers of the vehicle wheels 3, power receiving device 5, in-vehicle devices 6, and control device 7 in the mobile object 2 illustrated in FIG. 1 are just examples, and can be arbitrarily determined according to their applications or the like.

The mobile object 2 can travel on a road or other surface by means of the vehicle wheels 3. The mobile object 2 is, for example, an automobile, but is not limited to this. In addition to the automobile such as a passenger car, a truck, a bus, and a motorcycle, the mobile object 2 may be any vehicle that can travel on the road surface by means of the vehicle wheels 3, including an agricultural vehicle such as a tractor, a construction vehicle such as a dump truck, an airplane, a bicycle, and a wheelchair.

The vehicle wheels 3 are used to move the mobile object 2. The vehicle wheels 3, in a state of being mounted on the mobile object 2, each have a ground surface that is in contact with the road surface of the road or the like. In the present embodiment, each of the vehicle wheels 3 is a tire-wheel assembly having a tire 31 mounted on a wheel 32, but is not limited to this and may be any vehicle wheel that can be mounted on the mobile object 2 described above. In a case in which the vehicle wheel 3 is the tire-wheel assembly, the "ground surface" of the vehicle wheel 3 refers to a ground surface of the tire 31, that is, a surface of the tire 31 in contact with the road surface in a state in which the tire 31 is mounted on an applicable rim, filled with a specified internal pressure, and loaded with a maximum load.

In this specification, the "applicable rim" means a standard rim (Measuring Rim in ETRTO's STANDARDS MANUAL and Design Rim in TRA's YEAR BOOK) in an applicable size as described in or to be described in an industrial standard valid for regions where pneumatic tires are produced and used, such as JATMA YEAR BOOK of the JATMA (The Japan Automobile Tyre Manufacturers Association, Inc.) in Japan, STANDARDS MANUAL of the ETRTO (The European Tyre and Rim Technical Organisation) in Europe, YEAR BOOK of TRA (The Tire and Rim Association, Inc.) in the United States, and the like, but in the case of a size not listed in these industrial standards, the "applicable rim" refers to a rim with a width corresponding to a bead width of a pneumatic tire. The term "applicable rim" includes current sizes as well as sizes that may be included in the aforementioned industrial standards in the future. An example of a "future listed size" may be a size listed as "FUTURE DEVELOPMENTS" in the 2013 edition of ETRTO.

In this specification, the "specified internal pressure" refers to an air pressure (maximum air pressure) corresponding to a maximum load capacity of a single wheel in the applicable size and ply rating described in the aforementioned JATMA YEAR BOOK or other industrial standards. In the case of sizes not listed in the aforementioned industrial standards, the "specified internal pressure" refers to an air pressure (maximum air pressure) corresponding to a maximum load capacity specified for each vehicle on which the tire is mounted. Also, in this specification, a "maximum load" means a load corresponding to a maximum load capacity in the applicable size tire described in the aforementioned industrial standards, or, in the case of a size not listed in the aforementioned industrial standards, a load corresponding to a maximum load capacity specified for each vehicle on which the tire is mounted.

Figure 2:
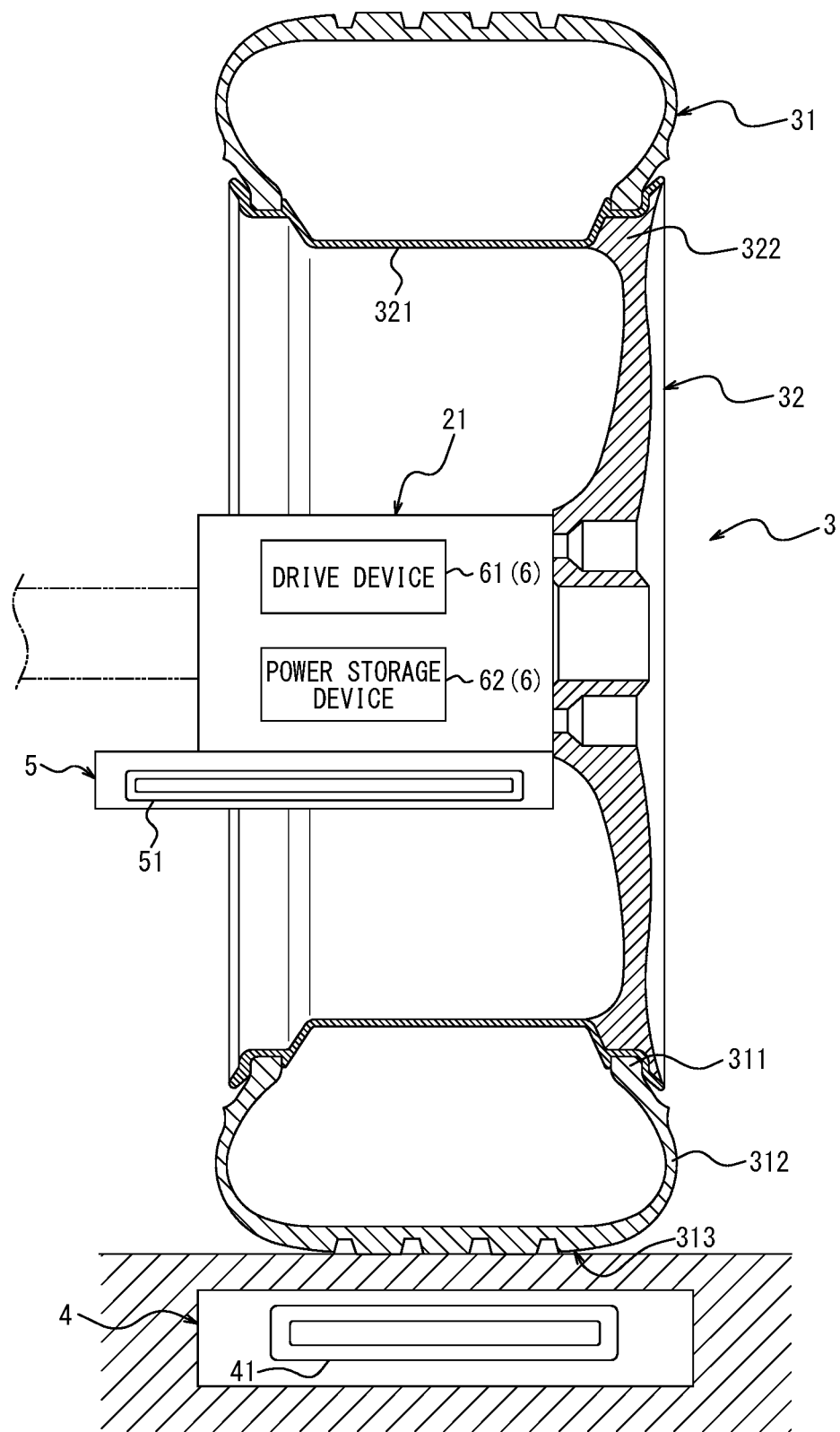
FIG. 2 is a schematic diagram of a tire-wheel assembly, as an example of the vehicle wheel, in the wireless power receiving system according to the embodiment of the disclosure, schematically illustrated in a cross-section in the width direction of the vehicle wheel.

FIG. 2 is a schematic diagram of the tire-wheel assembly, as an example of the vehicle wheel 3 in the wireless power receiving system 1 according to the embodiment of the disclosure, schematically illustrated in a cross-section in the width direction of the vehicle wheel 3.

As illustrated in FIG. 2, the tire 31 has a pair of bead portions 311, a pair of sidewall portions 312, and a tread portion 313. When the tire 31 is mounted on a rim portion 321 of the wheel 32, the bead portions 311 are configured to be in contact with the rim portion 321 on the inside in the radial direction and on the outside in the width direction. The sidewall portions 312 each extend between the tread portion 313 and each of the bead portions 311. The sidewall portions 312 are located outside the bead portions 311 in the radial direction. The tread portion 313 is located outside the sidewall portions 312 in the tire radial direction, and includes the ground surface of the tire 31.

The tire 31 is formed of rubber, such as natural rubber and synthetic rubber, and may include components, such as a carcass, a belt, and bead wires, that are formed of steel or other metal. For example, at least some of the components such as the carcass, belt, and bead wires may be formed of a non-magnetic material. This can reduce, when the power receiving device 5 is supplied with electric power wirelessly from the power transmission device 4 by an electromagnetic induction method, as described below, attenuation of a magnetic field generated by the power transmission device 4 before the magnetic field reaches the power receiving device 5, due to the presence of metal between the power transmission device 4 and the power receiving device 5, while maintaining strength of the tire 31. Thereby, power receiving efficiency of the power receiving device 5 can be improved. However, at least some of the components such as the carcass, belt, and bead wires need not be formed of the non-magnetic material.

The non-magnetic material includes a paramagnetic material and an antimagnetic material having low magnetic permeability. As the non-magnetic material, a resin material including, for example, a plastic resin such as polyester and nylon, a thermosetting resin such as a vinyl ester resin and an unsaturated polyester resin, and another synthetic resin may be used. Furthermore, the resin material may contain fibers such as glass, carbon, graphite, aramid, polyethylene, and ceramic as reinforcing fibers. As the non-magnetic material, any non-metallic material including not only resin but also rubber, glass, carbon, graphite, aramid, polyethylene, and ceramic may be used. Furthermore, as the non-magnetic material, a metallic material including a paramagnetic material such as aluminum or an antimagnetic material such as copper may be used.

The wheel 32 has the cylindrical rim portion 321 to mount the tire 31 thereon, and a disk portion 322 that is provided in the inside of the rim portion 321 in the radial direction and is supported and fixed to a hub 21 of the mobile object 2.

The wheel 32 may be formed of metal such as steel, but is not limited to this. At least part of the rim portion 321 of the wheel 32 may be formed of the above-described non-magnetic material. This can reduce attenuation of a magnetic field generated by the power transmission device 4 before the magnetic field reaches the power receiving device 5, due to the presence of metal such as steel between the power transmission device 4 and the power receiving device 5, while maintaining strength of the wheel 32, and thus improve power receiving efficiency of the power receiving device 5. However, at least part of the rim portion 321 of the wheel 32 need not be formed of the non-magnetic material.

Referring again to FIG. 1, the power transmission device 4 is provided with at least one power transmission coil (primary coil) 41. The power transmission device 4 is installed on a road surface of a road, a parking space, or the like. In the present embodiment, the power transmission device 4 is buried in the road or the like, but may be installed so as to be at least partially exposed to the road surface. In the drawing, the power transmission coils 41 are schematized for simplicity of explanation.

The power transmission coil 41 generates an alternating current magnetic field based on an alternating current supplied from a power source. In the present embodiment, the power transmission coil 41 is entirely configured in a ring shape. In this specification, a plane enclosed by the ring-shaped power transmission coil 41 is also referred to as a coil plane of the power transmission coil 41. The power transmission coil 41 is disposed such that the coil plane of the power transmission coil 41 is approximately in parallel with the road surface (in other words, an axial direction of the power transmission coil 41 is approximately perpendicular to the road surface), to generate the alternating current magnetic field toward an upper part of the road surface. The power transmission coil 41 provided in the power transmission device 4 is, for example, wound around a core such as a ferrite core and entirely configured as a ring, but is not limited to this and may be any coil capable of generating an alternating current magnetic field, such as a coil spring or an air-core coil. Thereby, when the vehicle wheel 3 passes over the power transmission device 4 while the mobile object 2 is traveling or the like, electric power can be wirelessly supplied from the power transmission coil 41 to a power receiving coil 51 by an electromagnetic induction method.

The power receiving device 5 is provided with at least one power receiving coil (secondary coil) 51. The power receiving coil 51 receives electric power supplied wirelessly from the power transmission coil 41 of the power transmission device 4. In the present embodiment, the power receiving coil 51 is entirely configured in a ring shape. In this specification, a plane enclosed by the ring-shaped power receiving coil 51 is also referred to as a coil plane of the power receiving coil 51. The power receiving coil 51 is disposed such that the coil plane of the power receiving coil 51 is approximately in parallel with the ground surface of the vehicle wheel 3 (in other words, an axial direction of the power transmission coil 41 is approximately perpendicular to the ground surface). Thereby, an electromotive force by electromagnetic induction is generated in the power receiving coil 51 based on the alternating current magnetic field generated by the power transmission coil 41, and a current flows through the power receiving coil 51. The power receiving coil 51 provided in the power receiving device 5 is, for example, wound around a core such as a ferrite core and entirely configured as a ring, but is not limited to this and may be any coil capable of generating an electromotive force, such as a coil spring or an air-core coil. In the drawing, the power receiving coils 51 are schematized for simplicity of explanation.

At least part of the power receiving coil 51 is contained in the vehicle wheel 3 of the mobile object 2. In the present embodiment, at least part (preferably, entirety) of the coil plane of the power receiving coil 51 is opposite the ground surface of the vehicle wheel 3. Thereby, when the ground surface of the vehicle wheel 3 is located above the power transmission coil 41, including when the coil plane of the power receiving coil 51 does not extend approximately in parallel with the ground surface of the vehicle wheel 3, at least part of the coil plane of the power receiving coil 51 can be opposite at least part of the coil plane of the power transmission coil 41 across the ground surface of the vehicle wheel 3. Therefore, it is possible to reduce the risk of an obstacle entering between the power transmission coil 41 and the power receiving coil 51, and the power receiving coil 51 can appropriately receive magnetic lines of force generated from the power transmission coil 41. As a result, power receiving efficiency in wireless power supply can be further improved.

In this specification, for example, a surface A (at least part of a surface A) "facing" with a surface B means that the surface A (at least part of the surface A) overlaps within a region that includes a range where the surface B extends and extends perpendicularly to the surface B (in other words, within a columnar region having the surface B as a cross-section).

In the present embodiment, at least part (preferably, entirety) of the ground surface of the vehicle wheel 3 is opposite the coil plane of the power receiving coil 51. From the viewpoint of further increasing power receiving efficiency, as in the present embodiment, at least part (preferably, entirety) of the coil plane of the power receiving coil 51 is preferably opposite the ground surface of the vehicle wheel 3, and/or at least part (preferably, entirety) of the ground surface of the vehicle wheel 3 is preferably opposite the coil plane of the power receiving coil 51.

The power receiving coil 51 of the power receiving device 5 may be contained in the vehicle wheel 3 of the mobile object 2 by any configuration. For example, the power receiving coil 51 may be installed, as illustrated in FIG. 2, in a portion attached to the vehicle wheel 3 from the inside of the vehicle wheel 3 in the radial direction, such as in the hub 21, in the mobile object 2. Thereby, in a state in which the wheel 32 of the vehicle wheel 3 is attached to the hub 21 of the mobile object 2, at least part of the power receiving coil 51 is contained in the inside of the wheel 32 in the radial direction.

The power receiving device 5 may be installed on an inner peripheral surface of the rim portion 321 of the wheel 32 or on an outer peripheral surface of the rim portion 321 of the wheel 32, such that the inner peripheral surface of the rim portion 321 and the coil plane of the power receiving coil 51 are approximately in parallel. Further, the power receiving device 5 may be installed on an inner peripheral surface of the tread portion 313 of the tire 31, or may be installed inside the tread portion 313 of the tire 31. By installing the power receiving device 5 closer to the ground surface of the tire 31 in this manner, power receiving efficiency of the power receiving device 5 can be further improved. Also, by installing the power receiving device 5 on the inner peripheral surface of the rim portion 321 of the wheel 32, it is possible to reduce the risk of damage to the power receiving device 5, when the tire 31 is punctured or the like.

In addition to the power receiving coil 51, the power receiving device 5 may further include a power conversion unit, a power storage unit, a measurement unit, and the like.

The power conversion unit converts electric power generated by the power receiving coil 51 into direct current electric power. The power conversion unit includes, for example, an AC/DC converter or the like.

The power storage unit stores electric power generated by the power receiving coil 51. The power storage unit may be, for example, a capacitor. In a case in which the power storage unit is a capacitor, charging and discharging can be performed in a shorter time than in a storage battery or the like, which is advantageous in a situation in which high responsiveness is required.

The measurement unit measures the intensity of electric power received by the power receiving device 5. The measurement unit is, for example, a voltmeter or an ammeter, but is not limited to this. The intensity of the electric power measured by the measurement unit may include any numerical information, such as, for example, electric power, the amount of electricity, voltage, current, magnetic flux, or magnetic flux density.

Referring again to FIG. 1, the in-vehicle devices 6 are installed in the mobile object 2 and energizably connected to the power receiving device 5. The in-vehicle devices 6 may be connected to the power receiving device 5 by wires. In such a case, power transmission efficiency from the power receiving device 5 to the in-vehicle devices 6 is improved, as compared to a case in which the power receiving device 5 is wirelessly connected to the in-vehicle devices 6. Also, the power receiving device 5 and the in-vehicle devices 6 may be connected so as to be able to energize wirelessly. In such a case, for example, wiring of power transmission lines for transmitting electric power from the power receiving device 5 to the in-vehicle devices 6 installed in a body of the mobile object 2, which is apart from the vehicle wheels 3, becomes unnecessary, so the risk of a break of the power transmission lines, due to rotation of the vehicle wheels 3, is reduced.

The in-vehicle devices 6 may include, for example, a drive device 61 that drives the vehicle wheels 3 by electric power. In such a case, the drive device 61 consumes electric power supplied from the power receiving device 5 to drive the vehicle wheels 3. In the present embodiment, the drive device 61 is in-wheel motors, at least part of which are contained in the vehicle wheels 3, but are not limited to these. The drive device 61 may be on-board motors, which are mounted on the body of the mobile object 2 and drive a shaft 22 of the mobile object 2 to drive the vehicle wheels 3.

For example, the in-vehicle devices 6 may include at least one power storage device 62 that store electric power. The power storage device 62 can store electric power supplied from the power receiving device 5 and supply the electric power to other in-vehicle devices 6. The power storage device 62 may be any storage battery, such as, for example, a lead-acid battery, a nickel-hydrogen storage battery, a lithium-ion battery, a sodium-sulfur battery, or a combination thereof.

The in-vehicle devices 6 are not limited to the examples described above, and may include any electronic devices installed in the mobile object 2, such as a communication device of the mobile object 2, a car navigation system, a media player, and in-vehicle sensors. The in-vehicle devices 6 may be installed as integral parts of the mobile object 2, or may be detachable.

The control device 7 controls at least either the power receiving device 5 or the in-vehicle devices 6. The control device 7 is, for example, an electronic control unit (ECU), but is not limited to this and may be any electronic device. The control device 7 may be energizably connected to the power receiving device 5, as one of the in-vehicle devices 6 described above.

FIG. 3 is a functional block diagram that schematically illustrates an example of configuration of the control device 7. As illustrated in FIG. 3, the control device 7 includes a control unit 71, a memory unit 72, a communication interface 73, an output interface 74, and an input interface 75. The control unit 71 is electrically connected to each of the memory unit 72, the communication interface 73, the output interface 74, and the input interface 75.

The control unit 71 may include at least one processor to provide control and processing capability for performing various functions. The control unit 71 may be a general purpose processor such as a CPU that executes a program that specifies control procedures, a dedicated processor that specializes in processing each function, or the like. The control unit 71 can control each of the memory unit 72, the communication interface 73, the output interface 74, and the input interface 75 described below to realize the functions thereof.

The memory unit 72 stores a process for controlling each function of the control device 7, information and programs used for the process, and the like. The memory unit 72 can be, for example, a semiconductor memory, a magnetic memory, an optical memory, or the like. The memory unit 72 can function, for example, as a main memory or an auxiliary memory. The memory unit 72 may be a cache memory or the like included in the control unit 71. The memory unit 72 may be a volatile memory or a non-volatile memory. In the present embodiment, the memory unit 72 stores, for example, a condition or the like used for selecting at least one of the in-vehicle devices 6 to which electric power received wirelessly by the power receiving device 5 is to be transmitted, as described in detail below.

The communication interface 73 includes any communication module, such as a CAN communication module, a wired LAN (local area network) communication module, and a wireless LAN communication module, as well as a mobile communication module corresponding to mobile communication standards such as 4G (Generation) and 5G. Thereby, the communication interface 73 is able to establish wired or wireless communication with the other in-vehicle devices 6 installed in the mobile object 2, electronic devices external to the mobile object 2, or the like.

The output interface 74 outputs information in the form of sound, vibration, light, or images. The output interface 74 may include at least one of, for example, a speaker, a vibrator, a light, and a display device. The output interface 74 may output information on electric power that the power receiving device 5 is receiving wirelessly, information on the in-vehicle device 6 to which the power receiving device 5 is supplying electric power, or the like. For example, when the power receiving device 5 is receiving electric power wirelessly, the control unit 71 can display information on the output interface 74, which is a display device, to notify a user that the electric power is being supplied wirelessly.

The input interface 75 receives an input operation from the user. The input interface 75 is, for example, an input device such as a touch panel, but is not limited to this. When the input interface 75 receives an input operation by the user, the input operation is transmitted to the control unit 71 as electronic information. The input operation may include, for example, an instruction to start a process in which the power receiving device 5 receives electric power wirelessly.

A control method of the power receiving device 5 and the in-vehicle devices 6 implemented in the wireless power receiving system 1 will be described below in detail with reference to FIG. 1. This control method may be performed, for example, by the control device 7 included in the wireless power receiving system 1. Suppose that at least the drive device 61 and the power storage device 62 are installed, as the in-vehicle devices 6, in the mobile object 2.

Example 1: Control of Electric Power Transmission from Power Receiving Device to In-vehicle Devices The control device 7 can, based on a predetermined condition, cause the power receiving device 5 to transmit electric power received wirelessly by the power receiving device 5 to at least one of the multiple in-vehicle devices 6, including, for example, the drive device 61 and the power storage device 62.

For example, the predetermined condition is a condition of the intensity of electric power received wirelessly by the power receiving device 5. For example, in a case in which the intensity of electric power received wirelessly by the power receiving device 5, as measured by the measurement unit of the power receiving device 5, is less than a predetermined reference value, the control device 7 may control the power receiving device 5 to transmit the electric power only to the drive device 61. For example, in a case in which the intensity of electric power received wirelessly by the power receiving device 5 is equal to or more than the predetermined reference value, the control device 7 may control the power receiving device 5 to transmit the electric power to both the drive device 61 and the power storage device 62.

For example, the predetermined condition may be a condition of a traveling state of the mobile object 2. For example, in a case in which the mobile object 2 is moving, the control device 7 may control the power receiving device 5 to transmit electric power to the drive device 61. For example, in a case in which the mobile object 2 is stopped, the control device 7 may control the power receiving device 5 to transmit electric power to the power storage device 62.

For example, the predetermined condition may be a condition of a state of charge of the power storage device 62. For example, in a case in which the a charging rate of the power storage device 62 is less than a predetermined reference value, the control device 7 may control the power receiving device 5 to transmit electric power preferentially to the power storage device 62. For example, in a case in which the charging rate of the power storage device 62 is equal to or more than the predetermined reference value, the control device 7 may control the power receiving device 5 to transmit electric power preferentially to the drive device 61.

Example 2: Control of Traveling of Mobile Object According to Amount of Received Electric Power In a case in which the control device 7 is an ECU, the control device 7 can control traveling of the mobile object 2 based on a condition of the intensity of electric power received wirelessly by the power receiving device 5. The control of traveling of the mobile object 2 by the control device 7 may be control that supports part of operations of a driver of the mobile object 2, or autonomous driving that needs no operation of the driver. In this specification, autonomous driving means that the control device 7 performs acceleration, deceleration, steering, and the like of the mobile object 2, in a state in which the mobile object 2 carries no occupants including a driver, or occupants of the mobile object 2 are not involved in driving of the mobile object 2. For example, the control device 7 can control the drive device 61, brake, transmission, and the like of the mobile object 2 to perform acceleration, deceleration, steering, and the like of the mobile object 2. In this specification, the autonomous driving also includes remote operation, in which the control device 7 executes acceleration, deceleration, steering, and the like of the mobile object 2 based on control signals from an external device communicatively connected to the control device 7.

For example, in a case in which the intensity of electric power received wirelessly by the power receiving device 5, as measured by the measurement unit of the power receiving device 5, is less than a predetermined reference value, the control device 7 may control the drive device 61 and the brake to reduce the speed of the mobile object 2 to extend the time for the power receiving device 5 to receive electric power. For example, in a case in which the intensity of the electric power received wirelessly by the power receiving device 5, as measured by the measurement unit of the power receiving device 5, is less than a predetermined reference value, the control device 7 may control the transmission to drive the mobile object 2 such that the vehicle wheel 3 is positioned over the power transmission device 4, in order to increase an area where the power receiving coil 51 of the power receiving device 5 is opposite the power transmission coil 41 of the power transmission device 4.

For example, when the control device 7 stops the mobile object 2 at a stop position near a traffic signal, at a parking space, or the like, the control device 7 may stop the mobile object 2 at a position where the intensity of electric power received wirelessly by the power receiving device 5, as measured by the measurement unit of the power receiving device 5, exceeds a predetermined reference value.

A variation of the wireless power receiving system 1 according to the embodiment of the present disclosure will be described below.

The power receiving coil 51 of the power receiving device 5 may be capable of supplying electric power bidirectionally. In other words, the power receiving coil 51 of the power receiving device 5 may be operable as a power receiving coil and also as a power transmission coil. In the case of operating as the power transmission coil, the power receiving coil 51 generates an alternating current magnetic field based on an alternating current supplied by a power source. For example, the power source may be the power storage device 62 that is energizably connected to the power receiving device 5. Thereby, the power receiving device 5 can supply electric power wirelessly from the power receiving coil 51.

In the variation, the power receiving device 5 can receive electric power supplied wirelessly from the power transmission device 4 installed on the road surface, and supply electric power wirelessly to a power receiving device installed on a road surface. Specifically, the power receiving device 5 operates as a power receiving device, while the mobile object 2 is traveling or stopping on the road surface on which the power transmission device 4 is installed, and can receive electric power wirelessly from the power transmission device 4. On the other hand, the power receiving device 5 operates as a power transmission device, while the mobile object 2 is traveling or stopping on the road surface on which the power receiving device is installed, and can transmit electric power wirelessly to the power receiving device installed on the road surface. As a result, even in a case in which the power receiving device 5 of the mobile object 2 operates as the power transmission device, at least part of the power receiving coil 51 is contained in the vehicle wheel 3 that is in direct contact with the road surface, thereby reducing the risk of an obstacle entering a space between the power receiving coil 51 and the power receiving device installed on the road surface.

In this variation, an example in which the power receiving device is installed on the road surface is described for the sake of simplicity of explanation, but is not limited to this. For example, the power transmission device 4 installed on the road surface may be capable of supplying power bidirectionally. In such a case, the power receiving device 5 installed in the mobile object 2 is able to wirelessly supply electric power bidirectionally with the power transmission device 4 installed on the road surface.

As described above, the wireless power receiving system 1 according to the embodiment of the disclosure includes the power receiving device 5 having the power receiving coil 51 configured to receive electric power supplied wirelessly from the power transmission coil 41 of the power transmission device 4 installed on the road surface, at least part of the power receiving coil 51 being contained in the vehicle wheel 3 of the mobile object 2; and the in-vehicle devices 6 installed in the mobile object 2, the in-vehicle devices 6 being energizably connected to the power receiving device 5, wherein the power receiving device 5 transmits the received electric power to the in-vehicle devices 6. According to such a configuration, at least part of the power receiving coil 51 is contained in the vehicle wheel 3 that is in direct contact with the road surface, thereby reducing the risk of an obstacle entering a space between the power transmission coil 41 and the power receiving coil 51 provided on the road surface. Therefore, the wireless power receiving system 1 can improve power receiving efficiency in wireless power supply.

In the wireless power receiving system 1 according to the embodiment of the disclosure, the in-vehicle devices 6 include the drive device 61 configured to drive the vehicle wheels 3 by the electric power. According to such a configuration, the wireless power receiving system 1 can receive the electric power to drive the mobile object 2 from outside the mobile object 2, thus enabling the power storage device 62 installed in the mobile object 2 to be smaller and lighter, and thus improving fuel consumption of the mobile object 2.

In the wireless power receiving system 1 according to the embodiment of the disclosure, the drive device 61 is the in-wheel motors at least part of which are contained in the vehicle wheels 3. According to such a configuration, since the drive device 61 and the power receiving device 5 are both contained in the vehicle wheels 3, the wireless power receiving system 1 can reduce a transmission loss of the electric power received by the power receiving device 5 according to a transmission distance to the drive device 61.

In the wireless power receiving system 1 according to the embodiment of the disclosure, the in-vehicle devices 6 include the power storage device 62 configured to store the electric power. According to such a configuration, the wireless power receiving system 1 can cause the power storage device 62 to store the electric power received from outside the mobile object 2, and to supply the electric power to the in-vehicle devices 6 at any timing, such as when the mobile object 2 travels on a road surface on which the power transmission device 4 is not installed.

In the wireless power receiving system 1 according to the embodiment of the disclosure, the power receiving device 5 transmits the received electric power to at least one of the multiple in-vehicle devices 6 based on a predetermined condition. According to such a configuration, the wireless power receiving system 1 can cause the power receiving device 5 to transmit the electric power received from outside the mobile object 2 by selecting a target of transmission from among the multiple in-vehicle devices according to the condition such as a traveling state of the mobile object 2. For example, in a case in which the in-vehicle devices 6 include the drive device 61 and the power storage device 62, the wireless power receiving system 1 can cause the drive device 61 to consume the electric power to drive the mobile object 2 or to store the electric power in the power storage device 62, depending on the condition such as the traveling state of the mobile object 2.

In the wireless power receiving system 1 according to the embodiment of the disclosure, the power receiving device 5 is energizably connected to the in-vehicle devices 6 by wires. According to such a configuration, the wireless power receiving system 1 can improve power transmission efficiency from the power receiving device 5 to the in-vehicle devices 6, as compared to a case in which the power receiving device 5 is wirelessly connected to the in-vehicle devices 6.

In the wireless power receiving system 1 according to the embodiment of the disclosure, the power receiving device 5 is energizably connected wirelessly to the in-vehicle devices 6. According to such a configuration, the wireless power receiving system 1 eliminates the need for wiring of power transmission lines for power transmission between the power receiving device 5 and each of the in-vehicle devices 6, thereby reducing the risk of a break of the power transmission lines.

In the wireless power receiving system 1 according to the embodiment of the disclosure, the mobile object 2 can perform autonomous driving. According to such a configuration, the mobile object 2 can automatically control acceleration, deceleration, steering, and the like of the mobile object 2 according to a state of receiving the electric power from outside the mobile object 2.

In the wireless power receiving system 1 according to the embodiment of the disclosure, the vehicle wheel 3 is the tire-wheel assembly constituted of the tire 31 and the wheel 32. According to such a configuration, the vehicle wheel 3 can further reduce the risk of creating a space in which an obstacle can enter between the tire 31 and the road surface by deforming the tire 31 according to the shape of the road surface.

In the wireless power receiving system 1 according to the embodiment of the disclosure, at least part of the coil plane of the power receiving coil 51 is opposite the ground surface of the vehicle wheel 3. According to such a configuration, the road surface on which the power transmission device 4 is installed and the ground surface of the vehicle wheel 3 are in direct contact with each other, so it is possible to reduce the risk of an obstacle entering between the power transmission coil 41 and the power receiving coil 51, and the power receiving coil 51 can appropriately receive magnetic lines of force generated from the power transmission coil 41. The wireless power receiving system 1 can further improve power receiving efficiency in wireless power supply.

In the wireless power receiving system 1 according to the embodiment of the disclosure, the power receiving coil 51 is capable of supplying electric power bidirectionally, and the power receiving device 5 wirelessly supplies electric power from the power receiving coil 51. According to such a configuration, the power receiving device 5 is able to not only receive electric power via the power receiving coil 51 but also transmit electric power. Accordingly, at least part of the power receiving coil 51 is contained in the vehicle wheel 3 that is in direct contact with the road surface, thereby reducing the risk of an obstacle entering a space between the power receiving coil 51 and the power receiving device installed on the road surface, while the electric power is supplied to the power receiving device installed on the road surface.

The mobile object 2 according to the embodiment of the disclosure includes: the vehicle wheels 3; the power receiving device 5 having the power receiving coil 51 configured to receive electric power supplied wirelessly from the power transmission coil 41 of the power transmission device 4 installed on the road surface, at least part of the power receiving coil 51 being contained in the vehicle wheel 3; and the in-vehicle devices 6 energizably connected to the power receiving device 5, wherein the power receiving device 5 transmits the received electric power to the in-vehicle devices 6. According to such a configuration, at least part of the power receiving coil 51 is contained in the vehicle wheel 3 that is in direct contact with the road surface, thereby reducing the risk of an obstacle entering a space between the power transmission coil 41 and the power receiving coil 51 installed on the road surface. Therefore, the mobile object 2 can improve power receiving efficiency in wireless power supply.

The vehicle wheel 3 according to the embodiment of the disclosure is the vehicle wheel 3 for the mobile object 2. The vehicle wheel 3 includes: the power receiving device 5 having the power receiving coil 51 configured to receive electric power supplied wirelessly from the power transmission coil 41 of the power transmission device 4 installed on the road surface, at least part of the power receiving coil 51 being contained in the vehicle wheel 3; and the in-vehicle devices 6 energizably connected to the power receiving device 5, wherein the power receiving device 5 transmits the received electric power to the in-vehicle devices 6. According to such a configuration, at least part of the power receiving coil 51 is contained in the vehicle wheel 3 that is in direct contact with the road surface, so it is possible to reduce the risk of an obstacle entering a space between the power transmission coil 41 installed on the road surface and the power receiving coil 51. Therefore, the vehicle wheel 3 can improve power receiving efficiency in wireless power supply.

Although the disclosure has been described based on the drawings and the embodiment, it is noted that a person skilled in the art can make various variations and modifications based on the disclosure. Accordingly, it is noted that these variations and modifications are included in the scope of the disclosure. For example, the configurations, functions, or the like included in each embodiment or each example can be rearranged so as not to be logically inconsistent. In addition, the configurations, functions, or the like included in each embodiment can be combined with another embodiment or another example, and multiple configurations, functions, or the like can be combined into one, divided, or partly omitted.

For example, all or part of functions or processing described as the functions or processing of the control device 7 in the above-described embodiment may be realized as the functions or processing of the power receiving device 5 or the in-vehicle devices 6. For example, a program describing a processing content to realize each function of the control device 7 of the embodiment may be stored in a memory or the like provided in the power receiving device 5 or the in-vehicle devices 6, and the program may be read and executed by a processor or the like of the power receiving device 5 or the in-vehicle devices 6.

For example, the above embodiment describes that the coil plane of the power receiving coil 51 is disposed so as to be approximately in parallel with the ground surface of the vehicle wheel 3, but is not limited to this. The coil plane of the power receiving coil 51 may be disposed at any angle from 0° to 90° with the ground surface of the vehicle wheel 3. The angle between the coil plane of the power receiving coil 51 and the ground surface of the vehicle wheel 3 may be arbitrarily determined according to an application of the power receiving device 5, the amount of electricity to be received, or the like.

For example, in the disclosure, the tire 31 is described as being filled with air, but is not limited to this. For example, the tire 31 can be filled with a gas such as nitrogen. Also, for example, the tire 31 may be filled with any fluid, including a liquid, a gel-like substance, a powder or granular substance, and the like, instead of or in addition to the gas.

REFERENCE SIGNS LIST 1 wireless power receiving system
2 mobile object
21 hub
22 shaft
3 vehicle wheel
31 tire
311 bead portion
312 sidewall portion
313 tread portion
32 wheel
321 rim portion
322 disk portion
4 power transmission device
41 power transmission coil
5 power receiving device
51 power receiving coil
6 in-vehicle device
61 drive device
62 power storage device
7 control device
71 control unit
72 memory unit
73 communication interface
74 output interface
75 input interface

The invention claimed is:

1. A wireless power receiving system comprising:
a vehicle wheel of a mobile object;
a power receiving device having a power receiving coil configured to receive electric power supplied wirelessly from a power transmission coil of a power transmission device at least partially embedded in a road, at least part of the power receiving coil being contained in the vehicle wheel; and
at least one in-vehicle device installed in the mobile object, the in-vehicle device being energizably connected to the power receiving device, wherein the power receiving coil is capable of supplying electric power bidirectionally, the power receiving device is configured to transmit the electric power received from the power transmission device to the in-vehicle device and wirelessly transmit electric power supplied from the in-vehicle device to a device at least partially embedded in the road, the vehicle wheel is a tire-wheel assembly constituted of a tire and a wheel, the wheel comprises a rim portion formed of a resin material, and the at least part of the power receiving coil is contained inside the rim portion of the wheel in a tire radial direction.

2. The wireless power receiving system according to claim 1, wherein the in-vehicle device includes a drive device configured to drive the vehicle wheel by the electric power received from the power transmission device.

3. The wireless power receiving system according to claim 2, wherein the drive device is an in-wheel motor at least part of which is contained in the vehicle wheel.

4. The wireless power receiving system according to claim 1, wherein the in-vehicle device includes a power storage device configured to store the electric power received from the power transmission device.

5. The wireless power receiving system according to claim 1, wherein the at least one in-vehicle device is a plurality of in-vehicle devices, and the power receiving device transmits the electric power received from the power transmission device to at least one of the plurality of the in-vehicle devices based on a predetermined condition.

6. The wireless power receiving system according to claim 1, wherein the power receiving device and the in-vehicle device are energizably connected by a wire.

7. The wireless power receiving system according to claim 1, wherein the power receiving device and the in-vehicle device are energizably connected wirelessly.

8. The wireless power receiving system according to claim 1, wherein the mobile object is able to perform autonomous driving.

9. The wireless power receiving system according to claim 1, wherein at least part of a coil plane of the power receiving coil is opposite a ground surface, in contact with a road surface of the road, of the vehicle wheel.

10. A mobile object comprising:
a vehicle wheel;
a power receiving device having a power receiving coil configured to receive electric power supplied wirelessly from a power transmission coil of a power transmission device at least partially embedded in a road, at least part of the power receiving coil being contained in the vehicle wheel; and
an in-vehicle device energizably connected to the power receiving device,
wherein the power receiving coil is capable of supplying electric power bidirectionally,
the power receiving device is configured to transmit the electric power received from the power transmission device to the in-vehicle device and wirelessly transmit electric power supplied from the in-vehicle device to a device at least partially embedded in the road,
the vehicle wheel is a tire-wheel assembly constituted of a tire and a wheel,
the wheel comprises a rim portion formed of a resin material, and
the at least part of the power receiving coil is contained inside the rim portion of the wheel in a tire radial direction.

11. A vehicle wheel for a mobile object, comprising:
a power receiving device having a power receiving coil configured to receive electric power supplied wirelessly from a power transmission coil of a power transmission device at least partially embedded in a road, at least part of the power receiving coil being contained in the vehicle wheel; and
an in-vehicle device energizably connected to the power receiving device,
wherein the power receiving coil is capable of supplying electric power bidirectionally,
the power receiving device is configured to transmit the electric power received from the power transmission device to the in-vehicle device and wirelessly transmit electric power supplied from the in-vehicle device to a device at least partially embedded in the road,
the vehicle wheel is a tire-wheel assembly constituted of a tire and a wheel,
the wheel comprises a rim portion formed of a resin material, and
the at least part of the power receiving coil is contained inside the rim portion of the wheel in a tire radial direction.

12. The wireless power receiving system according to claim 2, wherein the in-vehicle device includes a power storage device configured to store the electric power received from the power transmission device.

13. The wireless power receiving system according to claim 2, wherein the at least one in-vehicle device is a plurality of in-vehicle devices, and the power receiving device transmits the electric power received from the power transmission device to at least one of the plurality of the in-vehicle devices based on a predetermined condition.

14. The wireless power receiving system according to claim 2, wherein the power receiving device and the in-vehicle device are energizably connected by a wire.

15. The wireless power receiving system according to claim 2, wherein the power receiving device and the in-vehicle device are energizably connected wirelessly.

16. The wireless power receiving system according to claim 2, wherein the mobile object is able to perform autonomous driving.

17. The wireless power receiving system according to claim 2, wherein at least part of a coil plane of the power receiving coil is opposite a ground surface, in contact with a road surface of the road, of the vehicle wheel.

18. The wireless power receiving system according to claim 1 further comprising:
a control device communicatively connected to the power receiving device, wherein
the control device is configured to control the power receiving device to transmit the electric power received from the power transmission device to the in-vehicle device and control the power receiving device to wirelessly transmit the electric power supplied from the in-vehicle device to the device installed on a road surface of the road.

19. The wireless power receiving system according to claim 8 further comprising:
a control device configured to control traveling of the mobile object based on a condition of an intensity of the electric power received by the power receiving device from the power transmission device.

20. The wireless power receiving system according to claim 16 further comprising:
a control device configured to control traveling of the mobile object based on a condition of an intensity of the electric power received by the power receiving device from the power transmission device.

\* \* \* \* \*